(12) United States Patent
Zheng et al.

(10) Patent No.: US 7,220,104 B2
(45) Date of Patent: May 22, 2007

(54) VIBRATION REDUCTION SYSTEM FOR A WIND TURBINE

(75) Inventors: Danian Zheng, Clifton Park, NY (US);
Mohamed Ali, Clifton Park, NY (US);
Kirk Gee Pierce, Simpsonville, SC (US); Vasanth Kothnur, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 10/905,385

(22) Filed: Dec. 30, 2004

(65) Prior Publication Data

US 2006/0147306 A1    Jul. 6, 2006

(51) Int. Cl.
*F03D 11/04*    (2006.01)

(52) U.S. Cl. .................. 416/145; 416/DIG. 6; 415/4.3; 415/119

(58) Field of Classification Search ................ 416/144, 416/145, DIG. 6
See application file for complete search history.

(56) References Cited

U.S. PATENT DOCUMENTS 5,560,161 A    10/1996    Lou .......................... 52/167.2
6,626,642 B1    9/2003    Veldkamp .................... 416/79

FOREIGN PATENT DOCUMENTS

| EP | 1008747 A2 * | 6/2000 |
| WO | WO 99/63219 | 12/1999 |
| WO | WO 00/77394 A1 | 12/2000 |

* cited by examiner

*Primary Examiner*—Richard A. Edgar
(74) *Attorney, Agent, or Firm*—Cantor Colburn LLP (57) ABSTRACT

A wind turbine includes a tower, a nacelle supported at an upper end of a tower, a rotor having at least one blade and being arranged at the nacelle, and a vibration load reduction system disposed at either the tower or the nacelle. The vibration load reduction system includes a base, at least two columns extending from the base, and a flowable mass located within the base and the at least two columns.

19 Claims, 6 Drawing Sheets

VIBRATION REDUCTION SYSTEM FOR A WIND TURBINE

BACKGROUND OF THE INVENTION

This invention relates generally to wind turbines and more particularly to a vibration load reduction system for a wind turbine.

During operation, wind turbines are subjected to two types of loading. One of them is the temporary loading that occurs during an extreme gust of wind acting on the wind turbine rotor blades or an extreme wave breaking in offshore sites. The second type of loading is the relatively lower amplitude fatigue loading that repeats itself during a much longer period. This type of loading occurs during general wind turbulence and regular wave breaking in offshore situations. Current measures to counteract the extreme loading situation include turning the pitch angle to a feathered position and ensuring the tower design is adequate by properly selecting the material and reinforcing the structure. In addition a vibration opposer could help mitigate the extreme loading as well as reduce fatigue-loadings.

The dynamic loading on the wind turbine is the vibration in the tower induced by the single extreme peak load or periodic excitation force from wind or wave. Generally, designing a stiff tower is the simple and safe solution to counteract the loads. However, when the height exceeds 60–70 meters, this solution is not always practical because of the huge mass of material needed. Thus, the stiffness should be kept as low as is feasible, which leads to a "soft" tower design and the potential for more vibration.

One solution for reducing the vibration loading in a tower of a wind turbine is discussed in WO 00/77394, which uses a square box partially filled with liquid for damping oscillations of the first natural bending frequency of the wind turbine. The box provides for uni-directional damping of vibrations in the tower of the wind turbine along the two straight sides. However, because the vibrations on the tower can be multi-directional, this solution is not as effective against the vibrations on the tower from all of the directions.

BRIEF DESCRIPTION OF THE INVENTION

Exemplary embodiments of the invention include a wind turbine that includes a tower, a nacelle supported at an upper end of a tower, a rotor having at least one blade and being arranged at the nacelle, and a vibration load reduction system disposed at either the tower or the nacelle. The vibration load reduction system includes a base, at least two columns extending from the base, and a flowable mass located within the base and the at least two columns.

Further exemplary embodiments of the invention include a wind turbine that includes a tower, a nacelle supported at an upper end of the tower, a rotor having at least one blade and being arranged at the nacelle, and a vibration load reduction system disposed at either the tower or nacelle. The vibration load reduction system includes a means for reducing a multi-directional vibration that occurs in the tower. The means for reducing a multi-directional vibration is receptive to countering a first bending frequency of the tower.

In further exemplary embodiments of the invention, a method of reducing a vibration at a wind turbine is disclosed. The method includes providing a vibration load reduction system at a tower of the wind turbine; operating the wind turbine so as to incur a multi-directional vibration at the tower; and reducing the multi-direction vibration with the vibration load reduction system.

BRIEF DESCRIPTION OF THE DRAWINGS

Referring now to the drawings wherein like elements are numbered alike in the several FIGURES.

DETAILED DESCRIPTION OF THE INVENTION

Figure 1:
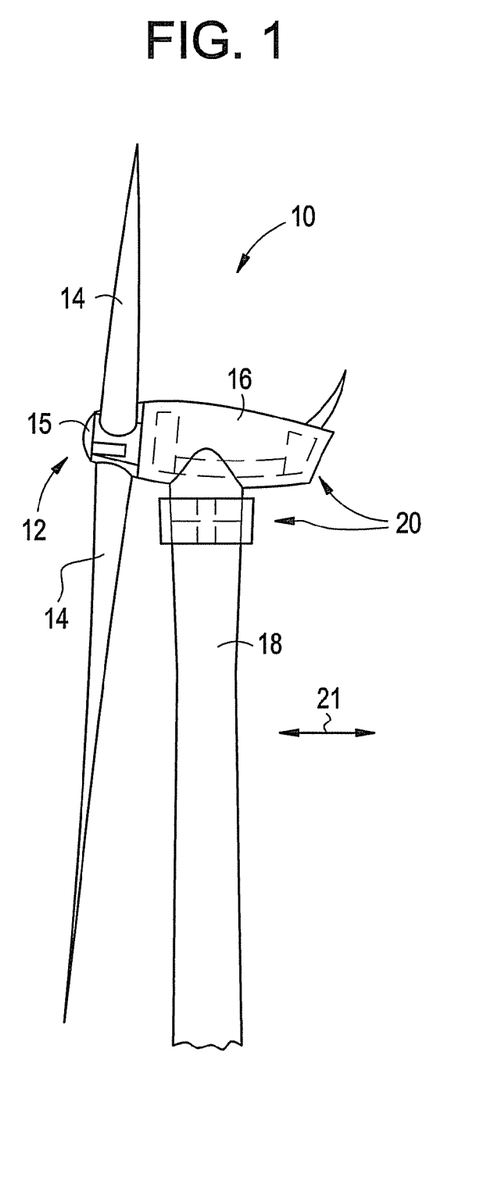
FIG. 1 illustrates a wind turbine having a vibration load reduction system.

FIG. 1 illustrates a wind turbine 10 having a rotor 12 that includes a number of blades 14 and a hub 15. The rotor 12 is arranged at a nacelle 16, which is placed on the top of a tower 18. Nacelle 16 holds a gearbox and a generator (not shown). Wind turbine 10 includes a vibration load reduction system 20, which may be located within the top 20% of the tower or at the top of the tower 18. When the vibration load reduction system 20 is at the top of the tower 18, the vibration load reduction system may be located at the nacelle 16, which is either merely an extension of the tower 18 or independently yawed structure relative to tower 18, as the nacelle 16 is attached to the top of the tower 18. Vibration load reduction system 20 may be located either inside or outside the nacelle 16 and the tower 18.

Figure 2:
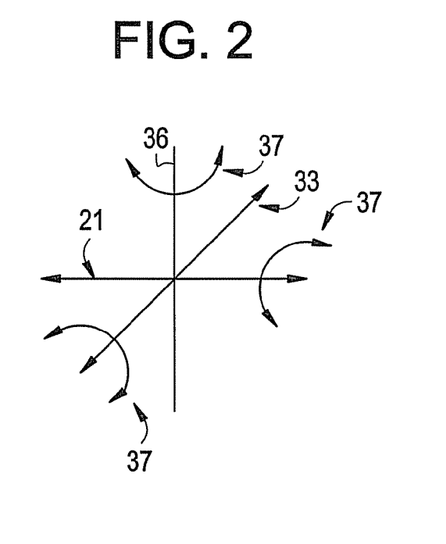
FIG. 2 illustrates respective axes and rotational vibration about each corresponding to the wind turbine of FIG. 1.

During operation and under an extreme wind loading event such as extreme gust and lost of grid, wind turbine 10 experiences a vibration at tower 18 that occurs in at least a first direction 21, which is perpendicular to a turning plane of the blades 14. The turning plane of the blades 14 corresponds to a vertical axis 36 and an axis 33 corresponding to a vertical plane illustrated in FIG. 2. Further, it will be recognized by one skilled in the pertinent art that there will be translational vibration in a direction 33 perpendicular to the direction or axis 21 defining a horizontal plane therewith and rotational vibration around axis 21, axis 33 perpendicular to axis 21 defining the horizontal plane in FIG. 2, and a vertical axis 36 defining a vertical plane with axis 33. Rotational vibration about axes 21, 33, and 36 is indicated generally with double-ended arrows 37. Vibration load reduction system 20 reduces the vibration, the load, and the movement of tower 18.

Referring to FIGS. 3–9, vibration load reduction system 20 includes at least two columns 22, a base 24, and a valve 26 located between the two columns 22. Each column 22 extends from the base 24. The number of columns 22 depends on various factors such as the available space, shape and sizing of the columns 22. Base 24 may be any shape and is illustrated as being round, so as to fit around the top of the tower 18, or rectangular, so as to fit within the inside of nacelle 16. When base 24 is located at tower, base 24 may also be triangular, square, rectangular, or polygon shape. When base 24 is round or polygon and has at least three columns 22, vibration load reduction system 20 is able to reduce vibration loads that are multi-directional. When base 24 is rectangular and has at least three columns 22, vibration load reduction system is able to reduce vibration loads that are multi-directional. It will be noted that reducing multi-directional vibration means reducing vibration in two or more dimensions.

There is a movable or fluid mass 28 (hereinafter referred to as "fluid mass") located in the columns 22 and the base 24. The fluid mass 28 includes any type of mass that can have motion, such as liquid, fine sand, small ball bearings, etc. The fluid mass 28 is evenly distributed through the columns 22 and the base 24. As the tower 18 starts to oscillate back and forth, the fluid mass 28 in the column 22 will flow up and down in each column 22, with the flow rate of the fluid mass 28 being controlled or tuned.

The vibration load reduction system 20 can be tuned by varying the fluid mass height in the columns 22 when the system is at rest and not in motion, and also by varying the length of the base 24 between the columns 22. This tuning process varies the natural frequency of the device so that the frequency can be matched to the first bending frequency of the wind turbine tower.

Another manner of controlling the vibration reduction of the system 20 is through the valve 26. The valve opening ratio affects the head-loss coefficient which in turn affects the internal damping of the system. The internal damping of the means determines the effective frequency bandwidth and hence the robustness of the effectiveness against the shifting of the tower first bending frequency. Furthermore, the internal damping of the device governs how fast the device will damp out the vibration energy. Although the main mechanism to achieve vibration load reduction is the inertia force instead of damping out the vibration by internal damping of the device, a relatively low level of the internal damping will help maintain the system internal stability. The valve openings may be set at a fixed opening so as to control the flow rate of the fluid mass 28. In this case, the vibration load reduction system 20 would be considered a passive vibration load reduction system. In addition, valves 26 may include proportional valves that may also be actuated by a voltage signal obtained from a battery or other power source to obtain the required internal damping without the use of a large amount of power. In this case, because the settings of the valve openings can be changed automatically, the vibration load reduction system 20 would be considered a semi-active vibration load reduction system. In the most advanced technology stage, actively controlled pressure from multiple air pumps can be added on top of the columns to achieve an active vibration load reduction system.

The vibration load reduction system 20 includes at least three columns 22 so that the fluid mass 28 can move back and forth between the three columns 22. When the base 24 is circular and there are at least three columns 22, the vibration load reduction system 20 provides for a reduction in vibration in the wind turbine. The base 24 can be any shape and have a multi-directional motion of water that introduces reduction in vibration load. Additional columns 22 may be added to provide a difference in vibration load reduction along multiple directions.

Figure 3:
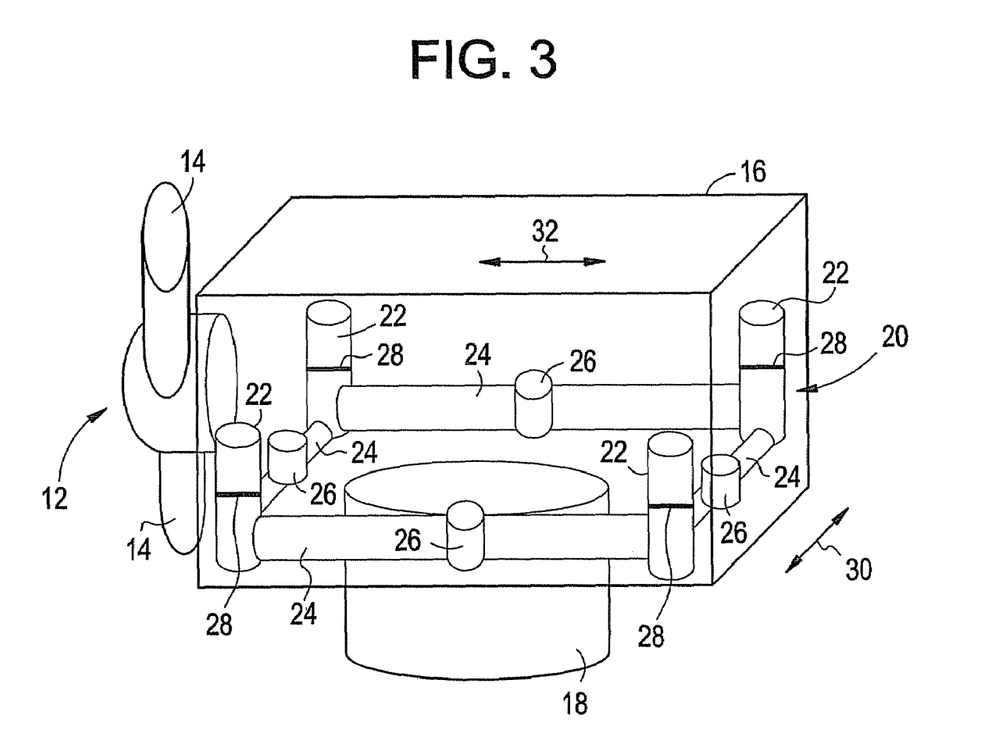
FIG. 3 illustrates the vibration load reduction system located at a nacelle of the wind turbine.

In particular, FIG. 3 illustrates an exemplary embodiment of the vibration load reduction system 20 located inside nacelle 16 and includes four columns 22 that are each located at the corners defining the rectangular base 24. The valves 26 are located between each of the columns 22. The four column embodiment allows for tuning of the vibration load reduction system 20 to occur in at least two directions, which is shown as a first direction 30 and a second direction 32.

Figure 6:
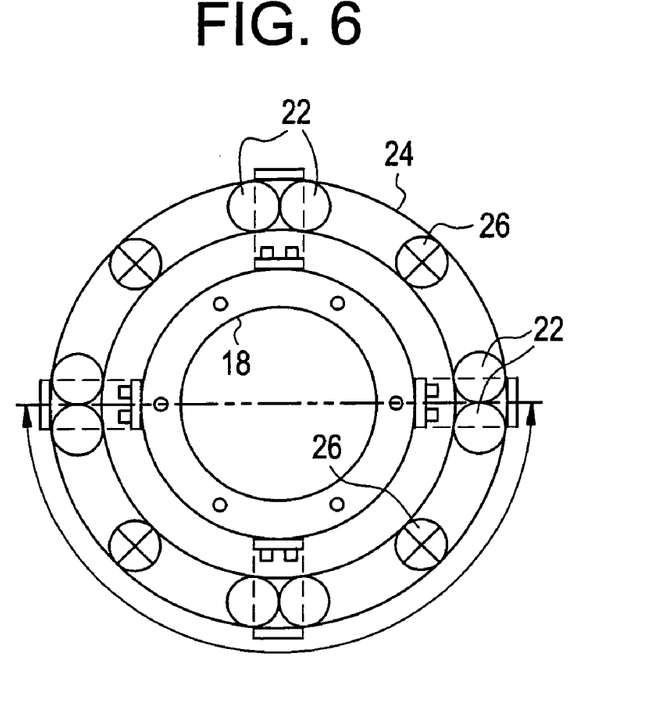
FIG. 6 illustrates a top plan view of the vibration load reduction load system located on a tower of the wind turbine and the vibration load reduction system having eight columns.
Figure 7:
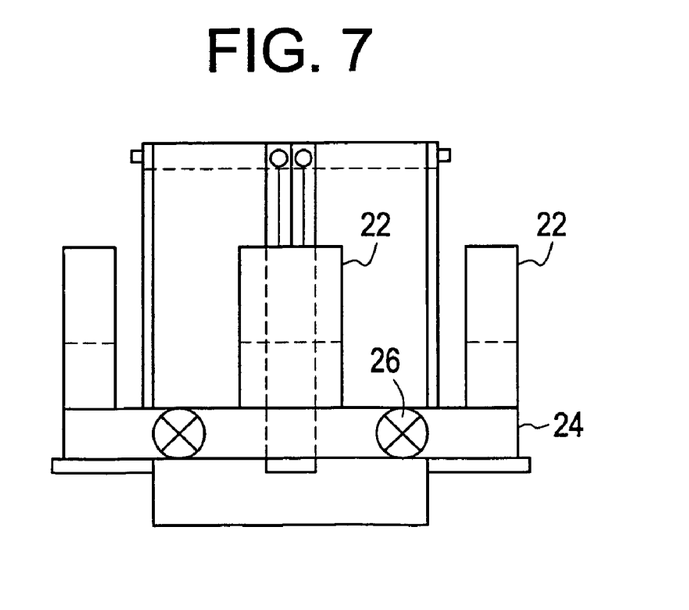
FIG. 7 illustrates an elevation view of the vibration reduction load system of FIG. 6.
Figure 8:
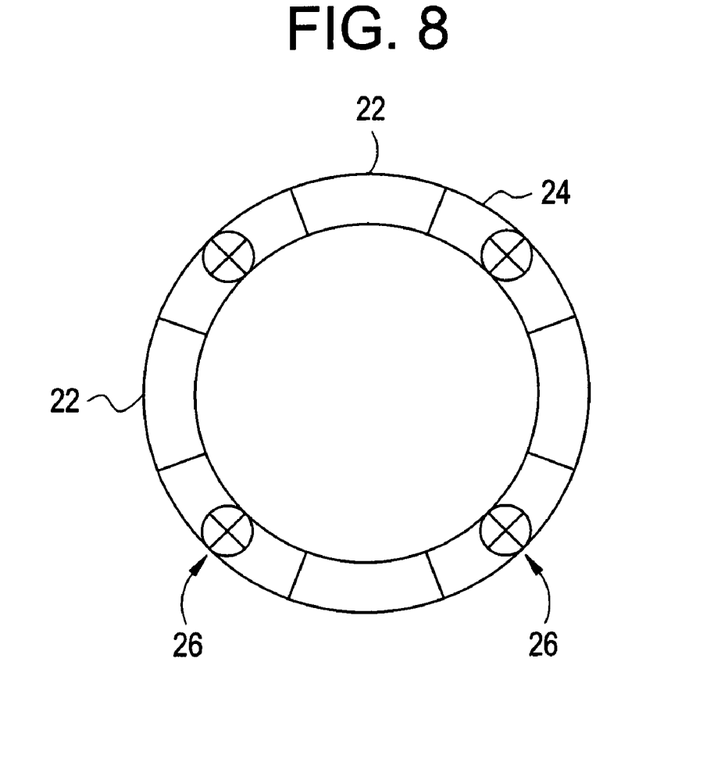
FIG. 8 illustrates a top plan view of the vibration load reduction system located inside a tower of the wind turbine and the vibration load reduction system having four columns.
Figure 9:
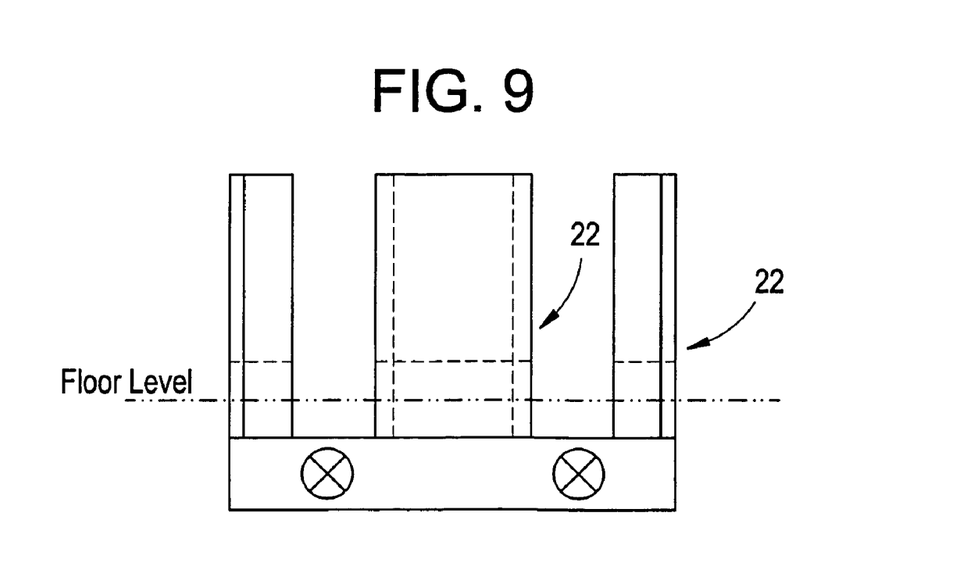
FIG. 9 illustrates an elevation view of the vibration load reduction system of FIG. 8.

FIGS. 4–9 illustrate an exemplary embodiment of the vibration load reduction system 20 located near the top of the tower 18 underneath the nacelle 16. In this case, the vibration load reduction system 20 is located either on the outside of the tower 18 or inside tower 18. The exemplary embodiments of FIGS. 4–7 illustrate the vibration load reduction system 20 with eight columns 22, which include four sets of two columns 22, and the four sets of columns are evenly distributed around the base 24. The use of additional columns allows for the height of the columns 22 to be shorter. There are four orifices or valves 26, with each valve 26 being located between each of the sets of columns 22. Here, the base 24 is circular so as to fit properly around the tower 18. FIGS. 8 and 9 illustrate an additional embodiment of the vibration load reduction system inside the tower 18 and shows four columns 22 with a valve 26 located between each column 22. Additional columns 22 located around the base 24 are also contemplated.

The vibration load reduction system 20 may be located anywhere near or at the top of the wind turbine. In exemplary embodiments, the vibration load reduction system is shown as being attached to the outside of the tower 18 (FIG. 5), the inside of the tower 18 (FIG. 4), and as being attached to the inside of the nacelle 16 (FIG. 3). The benefit of the system 20 is that it may be added to existing wind turbines as a retro-fit solution. The vibration load reduction system 20 is attached and secured to either the tower 18 or the nacelle at the base 24. The columns 22 extend in an upward direction and do not need to be specifically secured to the tower 18 or nacelle 16. The attachment of the vibration load reduction system to the wind turbine may be accomplished in any manner, such as brackets, bolts, welding, magnets, etc.

There are a number of design issues for the vibration load reduction system 20. The first issue is the choice of fluid mass 28 in the system. Fluid mass 28 includes both liquids and solids. Liquids include water, gasoline, engine oil, some heavy density mining selection fluid, and any other low viscosity liquid. In addition, the liquids may also include compounds to help counteract the effects of weather or include an electric heater disposed inside the vibration load reduction system. For instance, salt or antifreeze fluid such as but not limited to glycols may be added to reduce freezing and/or evaporation. A thin layer of oil may also cover the liquid to help prevent evaporation. An advantage to using a liquid such as water is that the water is low cost and readily available.

In addition, the weight range of the water may range from 0.5 to 8 percent of the weight of rotor blades 14, hub 15, and nacelle 16. In an exemplary embodiment, the rotor blades 14, hub 15, and nacelle 16 range in weight from about 80–300 tons. Thus, the weight of the water inside the vibration load reduction system would be approximately 0.4 tons to 24 tons.

However, one issue of using water is that there may be a large volume of fluid mass 28 and it may be undesirable to fit such a large volume of water into the nacelle 16 or onto the top of the tower 18. Thus, materials of higher density will reduce the volume of the fluid mass 28. A higher density fluid mass 28 includes fine sand, mercury, small ball bearings, or other solids that will produce a flow when the columns 22 are oscillating. When using the ball bearings, lubrication may be used to ensure that the ball bearings will move properly within the columns when the tower oscillates. In addition, ball bearings may be placed into oil or some other liquid to add additional mass to a liquid fluid mass 28. It is noted that any type of flowable mass 28 that will oscillate in counter-phase with the oscillations of the tower 18 may be utilized.

There are also a number of ratios that are taken into consideration when designing the system. The first ratio is the mass ratio, which is the weight of the fluid mass or flowable mass 28 to the combined weight of the rotor blades 14, hub 15 and nacelle 16. In an exemplary embodiment, the mass ratio ranges from 0.5% to 8.0%.

The second ratio is the length ratio, which is the horizontal length of the base 24 to the total length of the vibration load reduction system 20 for a system with two columns 22. The total length of the vibration load reduction system is the vertical height of the column 22 multiplied by two plus the horizontal length of the base 24. When there are more than two columns 22, the equivalent total water length is calculated. Generally, when increasing the length ratio, the efficiency of the vibration load reduction system increases. However, the vertical length of the column 22 should be designed with enough length so that fluid mass 28 does not spill out of the column 22. In addition, fluid mass 28 should remain in the column 22 at all times to provide continuity to the system 20.

The third ratio is the tuning ratio ($\gamma_{opt}$), which is the ratio of the natural frequency of the vibration load reduction system 20 to the first modal frequency of the wind turbine 10. When the natural frequency of the structure changes by $\Delta\omega_s$, (frequency for structure/base structure) the total length of the vibration load reduction system 20 needs to be compensated by the following relation, $$\Delta l = \frac{-4g}{(\omega_s)^3}\Delta\omega_s$$

where
$\Delta\omega_s$=change in natural frequency of the tower 18,
g=acceleration of gravity, and
$\Delta l$=change in total length of vibration system, which is the vertical length of the column 22 multiplied by 2 plus the horizontal length of base 24.

This formula allows for the change in the total length of the vibration load reduction system 20 to be calculated when the wind turbine first bending mode frequency changes. When different diameters of the column 22 are utilized, there is a conversion for the length of the column so that the liquid volume stays the same.

The overall damping ratio is the ratio with which the combination of the wind turbine and the vibration load reduction system 20 dissipates the kinetic energy of the fluid mass 28 inside the vibration load reduction system 20. In an exemplary embodiment, the overall damping ratio of the vibration load reduction system 20 will be substantially below an equivalent logarithmic decrement of 2.0%, with a preferable overall damping ratio below an equivalent logarithmic decrement of 1.0%. The main effect of the vibration load reduction system comes from the counter-actuating force from the motion of the inertia. When the damping ratio is lower, there is more counteracting effect of the vibration load reduction system 20 and thus, the vibration load reduction system 20 works with greater efficiency. Logarithmic decrement, $\delta$, of the system is defined by:

$$\delta = \frac{1}{n}\ln\left(\frac{a_1}{a_n}\right)$$

where n is the number of oscillations;
$a_1$ is the amplitude of the first peak of a sinusoidal wave signal;
$a_n$ is the amplitude of the n-th peak of a sinusoidal wave signal.

The size of each of the columns 22 is also considered when designing the vibration load reduction system 20. The total length of the vibration load reduction system 20, which is the height of the column 22 multiplied by two plus the horizontal length of the base 24, will vary depending on the cross-sectional area of the column 22 and the base 24. The total length of the vibration load reduction system 20 also depends on whether the columns 22 are individual columns 22, such as that shown in FIG. 3, or the columns are grouped together in sets, such as that shown in FIG. 4. The total length of the vibration load reduction system 20 may be calculated based on the following formula:

$$l_e = 2g/(\omega_s)^2 = 2g/(2\pi f_T)^2$$

$l_e$=the length of the vibration load reduction system 20,
g=acceleration of gravity, and
$\omega_s$=$2\pi f_T$=the first natural frequency of the wind turbine system in rad/s.
$f_T$=the first natural frequency of the wind turbine system in Hz.

Further sizing of the vibration load reduction system depends on the configuration. For example, the exemplary embodiments in FIGS. 6 and 7 have an equivalent water column length as:

$$l_e = 2L_V + \frac{A_V}{A_H}\frac{\pi D}{4}$$

where
$l_e$—Equivalent total length for frequency calculation
D—Base ring center diameter
$A_H$—Horizontal Ring Area
$L_V$—Vertical column height
$A_V$—Vertical Column Area
$\xi$—Headloss coefficient
$\rho$—Liquid density The outer diameter D of the base ring 24 may be determined by the geometry of the tower especially when the vibration load reduction system is installed inside the tower 18 or nacelle 16. The cross-sectional area ratio $A_V/A_H$ between the column 22 and base ring 24 could be picked up based on the vertical space limitation inside the tower top or nacelle. A good starting point is to use 2:1 to save on the vertical height so that the system can be disposed at a location as high as possible, thus benefiting the effectiveness. So the vertical water column height $L_V$ could be calculated as:

$$L_V = \frac{1}{2}\left(l_e - \frac{A_V}{A_H}\frac{\pi D}{4}\right)$$

So the cross-sectional area of the column 22 for the exemplary system in FIGS. 6 and 7 could be calculated as:

$$A_V = \frac{\mu M_{WTG}}{\rho\left(4L_V + \frac{A_H}{A_V}\pi D\right)}$$

μ=the mass ratio of the fluid mass 28, which is parameter that is selected and in an exemplary embodiment will be between 0.5% to 8%, $M_{WTG}$=the total weight of the rotor blades 14, hub 15, and nacelle 16, ρ=the density of water.

As explained above, the orientation of the columns 22 may also vary, by having either a rectangular orientation of the vibration load reduction system 20 or a circular orientation of the vibration load reduction system. For ease of installation, the shape of the system will depend on the location of the vibration load reduction system 20 at either the nacelle 16 or the tower 18. In addition, the number and placement of the columns is dependent on the fundamental frequencies in the wind turbine.

The size of the valve openings at the valves 26 can also be calculated. The size of the valve openings controls the internal damping ratio of the vibration load reduction system and hence the overall damping ratio of the combined system with turbine and the vibration reduction device. When the valve openings are smaller, the internal damping ratio is higher. As discussed above, it is preferable that the internal damping ratio be smaller. Thus, the vibration load reduction system operates in an exemplary embodiment with no valves 26 or at least a valve with a large opening. In addition, the valve 26 may also operate merely as an on/off switch to the vibration load reduction system 20.

The material of the columns 22 and base 24 can also vary and include such materials as steel, plastic, etc. Plastic provides for a lower cost system and also provides for a lighter system, which allows for the total weight of the system to be reduced.

Figure 4:
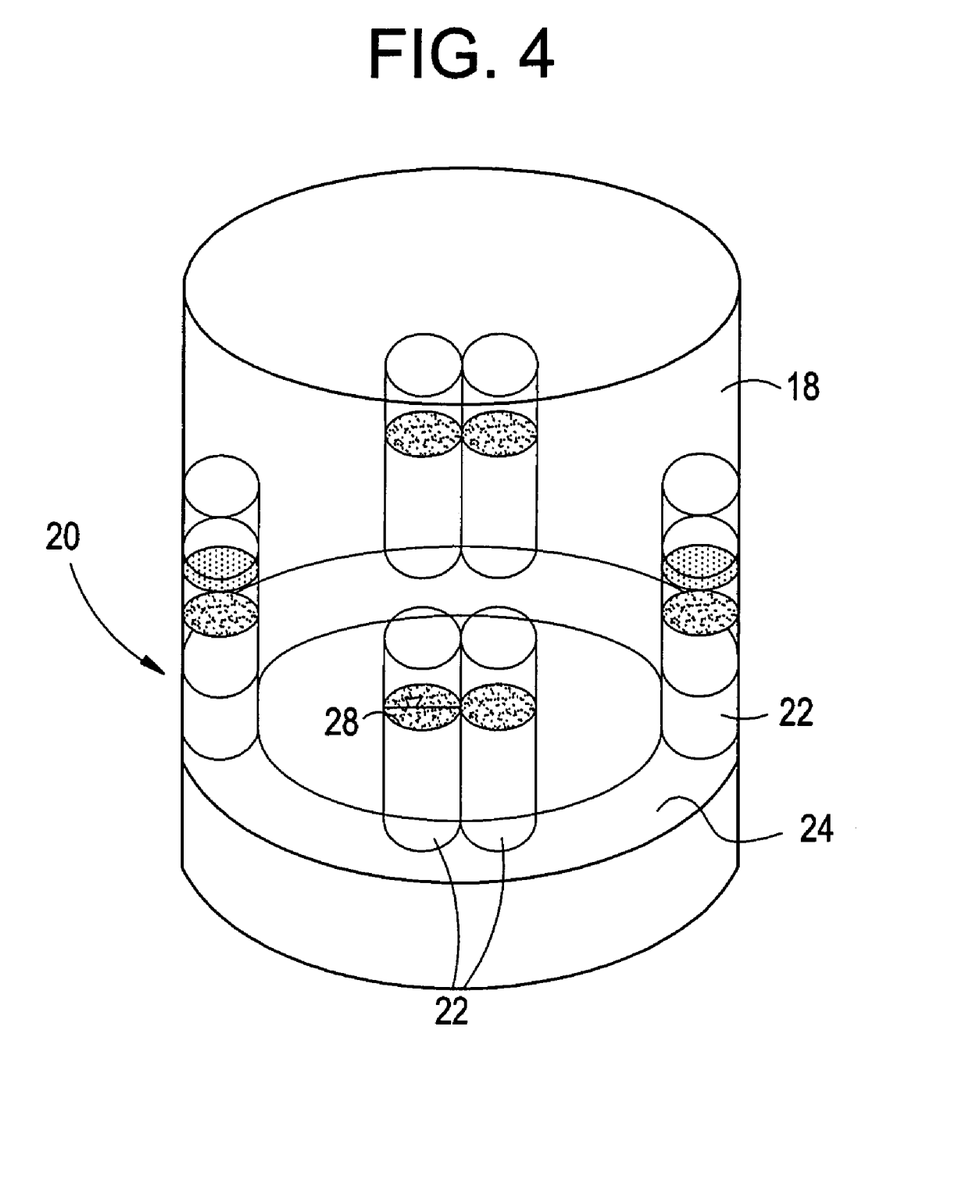
FIGS. 4 and 5 illustrate the vibration load reduction system located near a top of a tower of the wind turbine.
Figure 5:
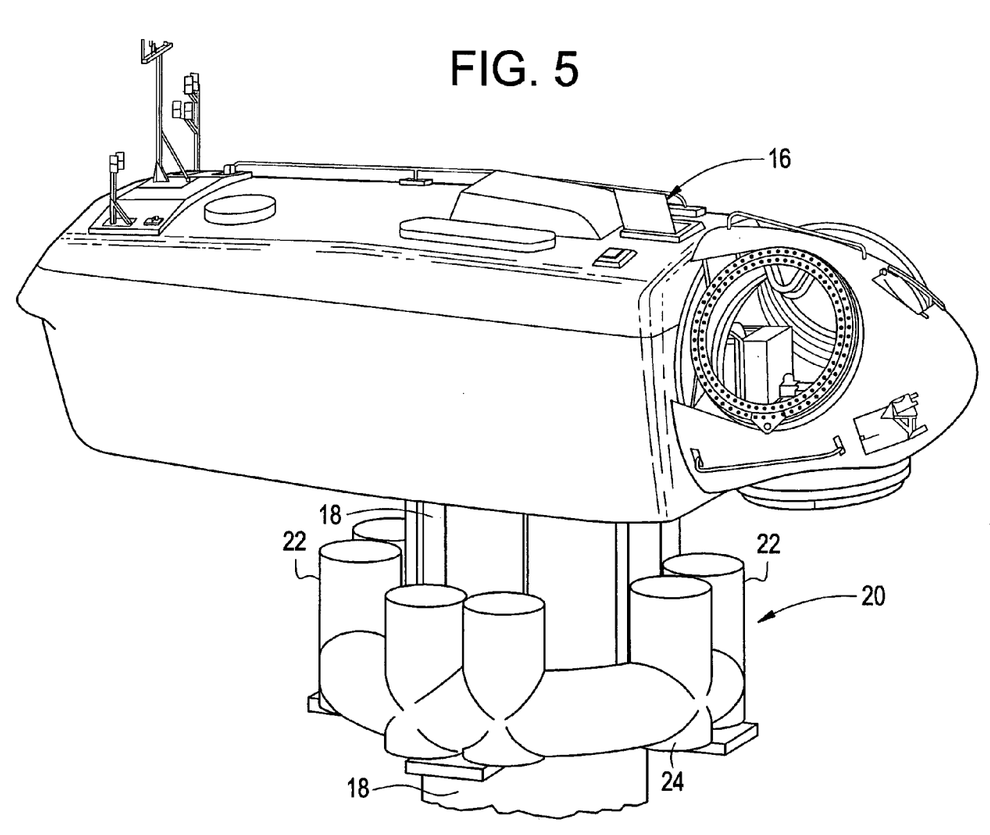

In an exemplary embodiment as shown in FIG. 4, which has 4 sets of vertical columns and 1 base ring and uses water as a fluid mass 28, the following variables were utilized:

Mass ratio μ=1.5%

Top mass of the wind turbine 10 equals $M_{WTG}$=$M_{nacelle+rotor}$=82200 Kg Mass of the vibration load reduction system 20 equals $M_{Damper}$=0.015*(82200 Kg)=1233 Kg Tower diameter=4 meters.

So the base ring center diameter D=3.8 meters

The Wind turbine first bending frequency=0.265 Hz.

So the equivalent length of the vibration load reduction system $l_e = 2g/(\omega_s)^2 = 2g/(2\pi f_T)^2 = 7.08$ meters Choose an $A_V/A_H$ ratio as 2:1 to keep the device profile low.

Then the vertical water column height is:

$$L_V = \frac{1}{2}\left(l_e - \frac{A_V}{A_H}\frac{\pi D}{4}\right) = 0.556 \text{ meters}$$

Cross section area of column 22 is $$A_V = \frac{\mu M_{WTG}}{\rho\left(4L_V + \frac{A_H}{A_V}\pi D\right)}$$
$$= 0.015 * 82200/1000/(4*0.556 + 0.5*pi*3.8)$$
$$= 0.1505(m^2).$$

$$A_V = \frac{A_V}{\left(\frac{A_H}{A_V}\right)} = 0.1505/2 = 0.0753(m^2)$$

The head loss coefficient ξ=20.

In another exemplary embodiment in which a higher damper counter-acting force is needed, the following variables may be utilized:

Mass ratio μ=5%

Top mass of the wind turbine 10 equals $M_{WTG}$=$M_{nacelle+rotor}$=82200 Kg Mass of the vibration load reduction system 20 equals $M_{Damper}$=0.05*(82200 Kg)=4110 Kg Tower diameter=4 meters.

So the base ring center diameter D=3.8 meters

The Wind turbine first bending frequency $f_T$=0.265 Hz.

So the equivalent length of the vibration load reduction system $l_e = 2g/(\omega_s)^2 = 2g/(2\pi f_T)^2 = 7.08$ meters Choose an $A_V/A_H$ ratio as 2:1 to keep the device profile low.

Then the vertical water column height is:

$$L_V = \frac{1}{2}\left(l_e - \frac{A_V}{A_H}\frac{\pi D}{4}\right) = 0.556 \text{ meters}$$

Cross section area of column 22 is $$A_V = \frac{\mu M_{WTG}}{\rho\left(4L_V + \frac{A_H}{A_V}\pi D\right)}$$
$$= 0.05 * 82200/1000/(4*0.556 + 0.5*pi*3.8)$$
$$= 0.5016(m^2).$$

$$A_V = \frac{A_V}{\left(\frac{A_H}{A_V}\right)} = 0.5016/2 = 0.2508(m^2)$$

The head loss coefficient ξ=50

These are merely examples of sample vibration load reduction systems 20 that may be utilized. However, there are numerous other embodiments of the vibration load reduction system 20 envisioned.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A wind turbine comprising:
   a tower;
   a nacelle supported at an upper end of a tower;
   a rotor having at least one blade, said rotor being arranged at said nacelle; and
   a vibration load reduction system disposed at either said tower or said nacelle, said vibration load reduction system includes:
   a base;
   at least two columns extending from said base; and
   a flowable mass located within said base and said at least two columns.

2. The wind turbine of claim 1, wherein said base has a shape that is at least one of round, rectangular, and polygon.

3. The wind turbine of claim 1, wherein when said base has one of a round shape and a polygon shape and includes said at least two columns extending from said base, said base is receptive to counteracting rotation of the nacelle relative to said tower.

4. The wind turbine of claim 1, wherein when said base has a rectangular shape and includes said at least three columns extending from said base, said base is receptive to counteracting rotation of the nacelle relative to said tower.

5. The wind turbine of claim 1, further comprising a valve located at said base between said columns.

6. The wind turbine of claim 1, wherein said flowable mass is selected so that a flow rate of said flowable mass will move in counter-phase with a first bending frequency of said tower.

7. The wind turbine of claim 1, wherein said flowable mass includes at least one of a liquid and ball bearings.

8. The wind turbine of claim 7, wherein said liquid includes at least one of compounds that reduce freezing and evaporation and an electric heater disposed inside the vibration load reduction system.

9. The wind turbine of claim 1, wherein said base is attached within said nacelle.

10. The wind turbine of claim 1, wherein said base is attached at said upper end of said tower.

11. The wind turbine of claim 1, wherein said columns are evenly distributed around said base.

12. The wind turbine of claim 1, wherein each of said columns includes a double column arrangement in which two columns are arranged next to each other.

13. A method of reducing a vibration at a wind turbine, the method comprising:
    providing a vibration load reduction system at a tower of said wind turbine;
    operating said wind turbine so as to incur a multi-directional vibration at said tower; and
    reducing said multi-directional vibration with said vibration load reduction system, wherein said vibration load reduction system is disposed at either said tower or a nacelle, and said vibration load reduction system comprises:
    a base;
    at least two columns extending from said base; and
    a flowable mass located within said base and said at least two columns.

14. The method of claim 13, further comprising configuring said base having a shape that is at least one of round, rectangular, and polygon.

15. The method of claim 14, wherein when said base has one of a round shape and a polygon shape and includes said at least two columns extending from said base, said base is receptive to counteracting rotation of the nacelle relative to said tower.

16. The method of claim 14, wherein when said base has a rectangular shape and includes said at least three columns extending from said base, said base is receptive to counteracting rotation of the nacelle relative to said tower.

17. The method of claim 13, further comprising: disposing a valve at said base between said columns.

18. The method of claim 13, wherein said flowable mass is selected so that a flow rate of said flowable mass will move in counter-phase with a first bending frequency of said tower.

19. The method of claim 13, wherein said flowable mass includes at least one of a liquid and ball bearings.

* * * * *